United States Patent [19]

Jeffries

[11] 4,378,707

[45] Apr. 5, 1983

[54] INDEXING APPARATUS

[75] Inventor: Richard W. Jeffries, Birmingham, Mich.

[73] Assignee: Jackson Machine Products, Madison Heights, Mich.

[21] Appl. No.: 180,385

[22] Filed: Aug. 21, 1980

[51] Int. Cl.[3] .................. F16H 29/04; B23Q 17/00
[52] U.S. Cl. ................................ 74/117; 74/123; 74/836; 74/822; 74/571 M
[58] Field of Search ............... 74/813 L, 822, 817, 74/571 R, 571 L, 571 M, 116, 117, 119, 123, 835, 836

[56] References Cited

U.S. PATENT DOCUMENTS

| | | | |
|---|---|---|---|
| 276,292 | 4/1883 | Seymour | 74/571 M |
| 2,437,530 | 3/1948 | Hoopes | 74/571 R |
| 3,103,825 | 9/1963 | Bryant | 74/116 |
| 3,135,402 | 6/1964 | McCanse | 74/571 |

FOREIGN PATENT DOCUMENTS

| | | | |
|---|---|---|---|
| 245419 | 4/1926 | United Kingdom | 74/116 |
| 215677 | 7/1968 | U.S.S.R. | 74/116 |

*Primary Examiner*—Kenneth Dorner

*Attorney, Agent, or Firm*—Basile, Weintraub & Hanlon

[57] ABSTRACT

An indexing apparatus operated by a unidirectionally rotating drive shaft. The drive shaft and a driven member are rotatingly supported by a base in a spaced apart manner. An interconnecting link extends between the drive shaft and the driven member and is pivotally pinned in an offset manner at a first end to the drive shaft. A second end of the interconnecting link is pivotally pinned in an offset manner to the driven member. When the drive shaft rotates it oscillates the driven member in opposite first and second directions through an arc. A releasable engaging device carried by the driven member releasably engages an index member rotatably carried by the base. The releasable engaging device engages the index member during oscillation of the driven member in a first direction, and a timed locking means operated in timed relation to the rotation of the drive shaft selectively engages the index member locking it against rotation in the second direction and releasing the index member for rotation during oscillation of the driven member in the first direction. An arc adjusting device is provided to vary the arc through which the driven member oscillates.

3 Claims, 5 Drawing Figures

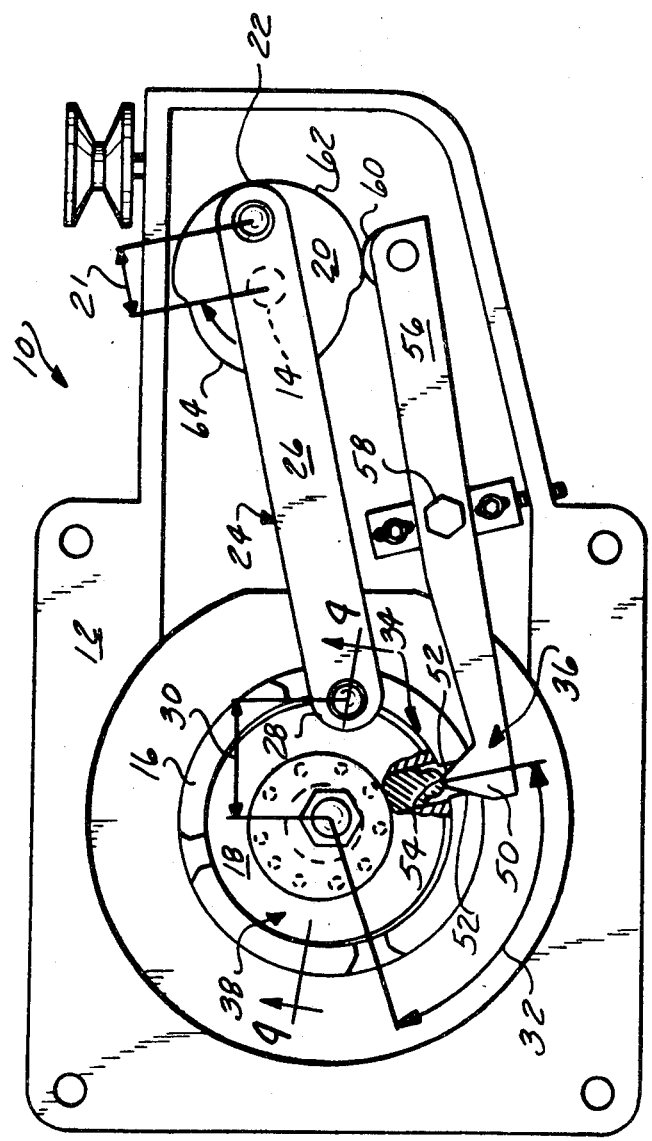

INDEXING APPARATUS

BACKGROUND OF THE INVENTION

I. Field of the Invention

The present invention generally relates to index devices and, in particular, the present invention is concerned with index devices driven by a unidirectionally rotating drive shaft. Even more particularly the present invention is concerned with indexing devices driven by a unidirectionally rotating drive shaft and including a device for adjusting the arc through which the apparatus moves when indexing.

II. Description of the Prior Art

Indexing devices have long been employed in many manufacturing processes to index a tool holder, jig, workpiece, etc. sequentially along a circular path. Each step of the indexing operation constituting a station for loading, unloading, or machining the workpiece. Indexing devices employing a geneva movement are the most commonly known apparatus. The apparatus of the present invention is concerned with an indexing device wherein the power to rotate the table is derived from a continuously unidirectionally rotating drive shaft providing a smooth and predictable indexing action wherein the beginning and the end of the arc through which the indexing device operates is predictable and adjustable and not subject to abrupt jerks and stops. The present invention provides an adjustable indexing arc which permits the indexing operation to begin and end at a precise point permitting the acceleration and deceleration of the index table in the smoothest possible manner. The closest example of an indexing device wherein the power supplied to rotate the table is derived from a continuously unidirectional rotating drive shaft is disclosed in U.S. Pat. No.: 3,103,825. This United States Patent is relevant to the Applicant's invention in that it represents the closest prior art utilizing a continuously unidirectionally rotating drive shaft to power the index device.

SUMMARY OF THE INVENTION

The present invention, which will be described in greater detail hereinafter, comprises an indexing apparatus operated by a unidirectionally rotating drive shaft supported on a base. An indexing member is rotatably mounted to the base, and a driven member supported by the base is adapted to selectively and rotatably engage the indexing member. An interconnecting means is provided to interconnect the drive shaft and the driven member whereby the drive shaft oscillates the driven member in opposite first and second directions through an arc. Releasable engaging means carried by the driven member engage the index member during oscillation of the driven member in a first direction. A locking means is provided which is operated in timed relation to rotation of the drive shaft to selectively engage in the index member and to lock the index member against rotation and to release the index member for rotation during oscillation of the driven member in the first direction. A means is provided for varying the length of the arc by varying the distance between a rotational axis of the driven member and a point where the interconnecting means engages the driven member.

It is therefore an object of the present invention to provide an indexing device powered by a universally rotating shaft wherein a positive and accurate positioning of the indexing member is provided and wherein a means is provided for adjusting the index arc.

It is yet another object of the present invention to provide a power driven indexing device wherein a smooth indexing action is provided with a slow start and a slow stopping movement, with precise location of the starting and stopping movements achieved by adjustments of the arc of index.

It is a further object of the present invention to provide a power driven index table which is economical to manufacture, easy to maintain, and easy to adjust the indexing arc.

Further objects, advantages, and applications of the present invention will become apparent to those skilled in the art of indexing apparatus when the accompanying description of one example of the best mode contemplated for practicing the invention is read in conjunction with the accompanying drawing.

BRIEF DESCRIPTION OF THE DRAWING

In the drawing, like reference numbers refer to like parts throughout the several views, and wherein:

FIG. 1 is a bottom view of an index table constructed in accordance with the present invention;

FIG. 2 is the device of FIG. 1 with the driven member rotated to engage the index member;

FIG. 3 is the device of FIG. 2 at the beginning of index member rotation;

DESCRIPTION OF THE PREFERRED EMBODIMENT

Figure 4:
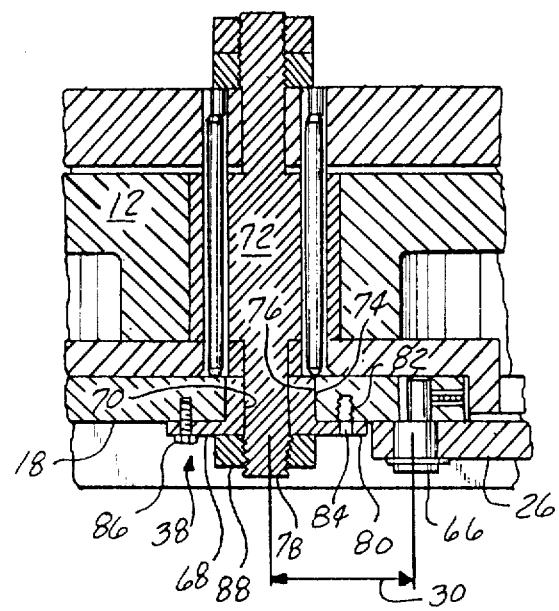
FIG. 4 illustrates a broken cross sectional view of the device of FIG. 1 taken along the lines 4—4 of FIG. 1.

Referring now to the drawing, there is illustrated in FIG. 1 one example of the present invention in the form of an indexing apparatus 10. The indexing apparatus 10 comprises a base 12 supporting a unidirectionally rotating drive shaft 14 and an index member 16 rotationally supported by the base 12. A driven member 18 is rotatably supported by the base 12 and adapted to selectively and rotatably engage the index member 16. A cam member 20 is rotatably driven by the drive shaft 14 and includes a first crank arm 21 adapted to engage a first end 22 of an interconnecting means 24. The interconnecting means 24 is a preferred embodiment comprises a link 26 having the first end 22 pivotally connected to the cam 20 and a second end 28 pivotally connected to the driven member 18. A distance between the rotational center of the driven member 18 and a point where the second end 28 pivotally joins the link 26 to the driven member defines a second crank arm 30. As the drive shaft 14 rotates, the first crank arm 21, the link 26 and the second crank arm 30 oscillate the driven member 18 in opposite first and second directions through an arc 32. A releasable engaging means 34 carried by the driven member 18 selectively engages the index member 16 during oscillation of the driven member in the first direction, and a locking means 36 operated in timed relation to rotation of the cam 20 selectively engages the index member 16 to lock the index member against rotation and to release the index member for rotation during oscillation of the driven member 18 in the first direction. The indexing apparatus of the present invention further includes a means 38 for varying the length of the second crank arm 30 in a manner which will be described in greater detail hereinbelow.

As can be seen in FIG. 2 of the drawing, the releasable engaging means 34 comprises: a dog 40 radially movable within a slot 42 formed in the driven member 18; a biasing means such as a spring 44 urges the dog 40 radially outward. A plurality of complementary indexing slots 46 slidingly engage the dog 40 and induce the index member 16 to rotate with the driven member 18 in the first direction. Outer edges 48 of the indexing slots 46 are chamfered to a wedge like configuration to engage the locking means 36 in a manner which will be described subsequently.

The locking means 36 comprises a locking head 50 having complementary edges 52 to abut the outer edges 48 of the indexing slots 46 and selectively lock the indexing member 16 against rotation. As illustrated in FIG. 1, when the locking head 50 is engaging the outer edges 48 a nose of the locking head 54 projects into the slot 46 preventing the dog 40 from entering the slot 46 where the locking head 50 is engaged. This permits the dog 40 to allow the driven member 18 to proceed in the second (clockwise) direction while the indexing member 16 is locked into position. The locking head 50 is attached to an end of a rocker arm 56 which pivots about a pin 58 with the locking head 50 caused to enter or leave the indexing slots 46 by lobes of the cam 20 engaging a cam roller 60 attached to the rocker arm 56. A high cam lobe 62 of the cam 20 forces the locking head 50 into engagement with the index member 16 locking the index member in place, and a low cam lobe 64 allows the locking head 50 to leave the slot 46 and permit rotation of the index member 16. It can be readily seen by the skilled artisan that cam 20 permits engagement of the locking means 36 with the index member 16 in a timed relation to rotation of the drive shaft 14.

Referring again to FIG. 1 of the drawing, it can be readily seen that as the cam 20 rotates in a clockwise direction, link 26 induces a clockwise or second direction rotation of the driven member 18, and the nose 54 of the locking head 50 moves the dog 40 out of the slot 46 to permit clockwise rotation of the driven member 18 as the cam 20 continues its rotation. As shown in FIG. 2 of the drawing as the dog 40 approaches the slot 46 clockwise from the slot engaged by the locking means 36, the dog 40 engages the slot 46 to induce a counterclockwise rotation of the index member 16 as the driven member 18 is moved in a counterclockwise or the second direction by the link 26. This counterclockwise motion of the index member 16 is permitted by the locking head 50 being permitted to leave the slot 46 as the roller 60 leaves the high cam lobe 62 and enters the low cam lobe 64 as shown in FIG. 2 of the drawing. As shown in FIG. 3 of the drawing, the link 26 rotates the driven member 18 and the index member 16 in a counterclockwise direction until the slot 46 is opposite the locking head 50 and the high cam lobe 62 forces the locking head 50 into engagement with the slot 46 and forces the dog 40 out of engagement with the slot 46 to lock the index member 16 in a fixed position.

It can be readily seen by the skilled artisan that unless the arc 32 is precise and places the slot 46 directly in line with the locking head 50, a jerking or perhaps a reversing movement of the index member 16 will occur producing poor alignment of the indexing member and resulting in poor operation of the indexing device and heavy wear. With reasonable manufacturing tolerances allowed for the various parts in the mechanism, it is virtually impossible to attain the precise length of arc 32 to allow optimum operation. The present invention provides the means 38 for adjusting the length of the arc 32 to allow the smoothest possible engagement of the locking means 36 with the index member 16 as will be described hereinbelow.

Referring again to FIG. 1 of the drawing, it would be apparent to one skilled in the art, that with the first crank arm 21 fixed in length, any change in the second crank arm 30 will change the arc 32 accordingly. For example, if the second crank arm 30 is reduced, the indexing arc 32 would be increased. Conversely, if the second crank arm 30 is increased, the length of the arc 32 would be reduced.

Figure 5:
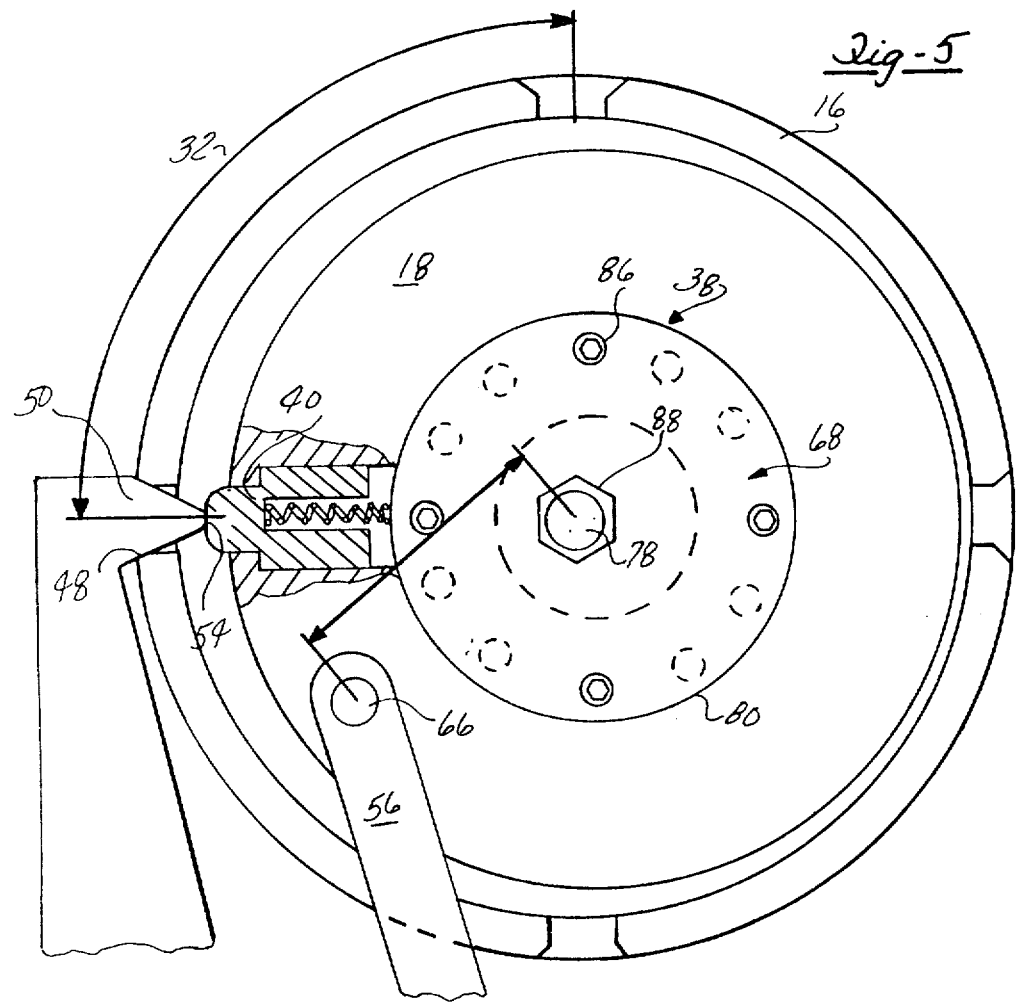
FIG. 5 illustrates an enlarged broken view of the device illustrated in FIG. 2 showing the arc adjusting device.

Referring now to FIGS. 4 and 5 of the drawing, the means 38 for varying the length of the second crank arm 30' comprises: a first pin 66 having a rotational centerline and pivotally attaching the link 26 to the driven member 18; an eccentric bushing 68 having a rotational centerline and including an inside diameter 70 rotatably supported by a shaft 72 which is rotatably supported by the base 12 and an outside diameter 74 rotatably engageable with a bore 76 formed in the driven member, the inside diameter 70 and the outside diameter 74 having parallel spaced apart axes; a distance between the rotational centerlines of the bushing inside diameter 70 and the first pin 66 defining the length of the second crank arm 30. Rotation of the eccentric bushing 68 within the driven member bore 76 varies the second crank arm 30 to vary the arc 32. The eccentric bushing 68 is rotatably supported by a lower end 78 of the shaft 72. The eccentric bushing 68 further includes a flange 80 formed at one end of the bushing extending radially outward therefrom and abutting the driven member 18. A plurality of angularly spaced threaded apertures 82 are formed in the driven member 18 and positioned on a circle concentric with the driven member bore 76. An aperture 84 is formed in the flange 80 to selectively align with the threaded apertures 82. A bolt 86 is utilized to engage the aligned aperture 84 and threadingly engage the threaded aperture 82 to secure the eccentric bushing 68 to the driven member 18. An end of the lower end 78 is threaded with a nut 88 threadingly engaging the thread to rotatably secure the bushing 68 to the shaft 72.

It can thus be seen that the present invention has provided a new and improved indexing apparatus operated by a unidirectionally rotating drive shaft. The provision by the present invention of a device to vary the arc through which the driven member oscillates allows a smooth and jerk free operation of the indexing device and minimizes wear.

It should be understood by those skilled in the art of indexing devices that other forms of the Applicant's invention may be had, all coming within the spirit of the invention and the scope of the appended claims.

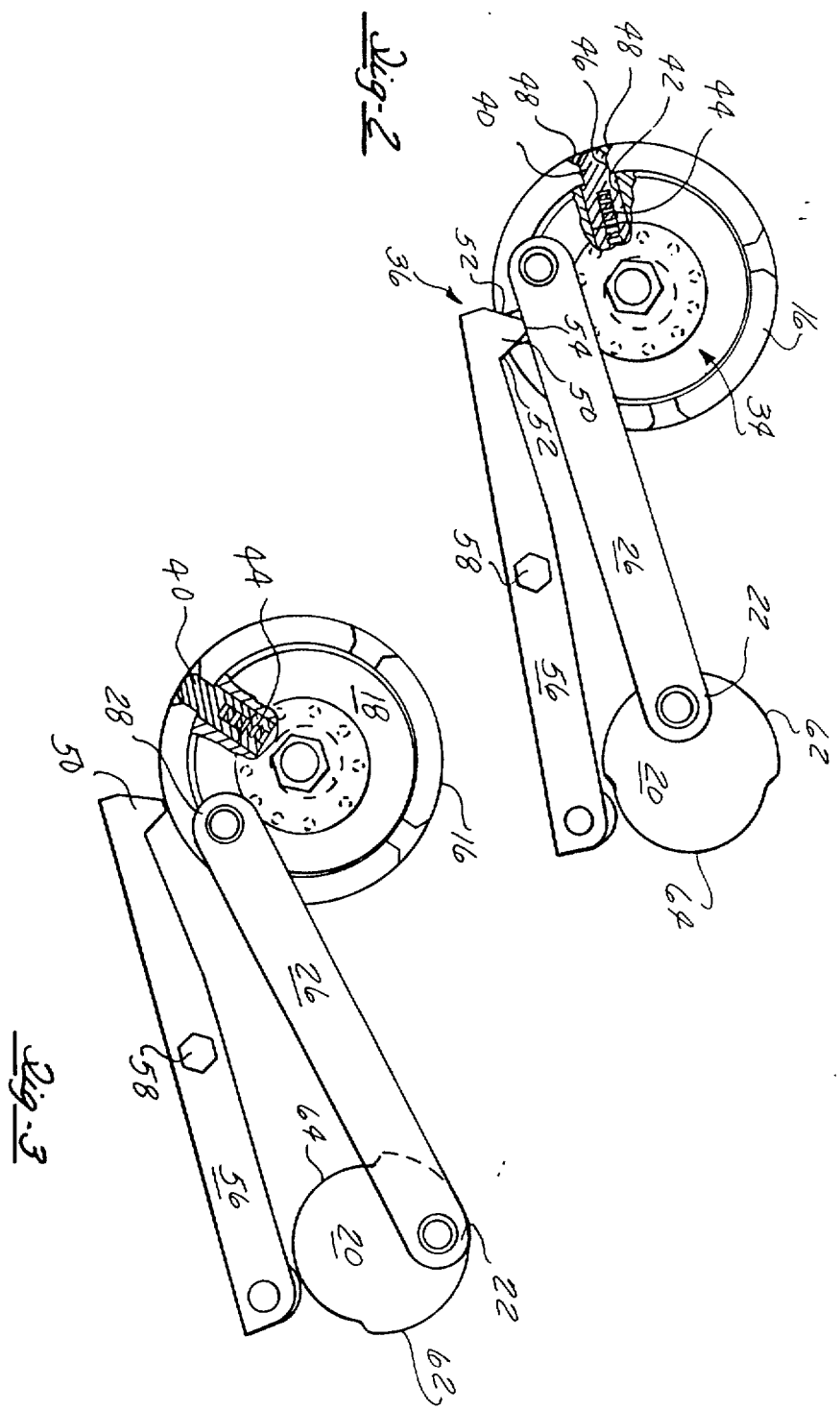

Having thus described my invention what I claim is:

1. In an indexing apparatus operated by a unidirectionally rotating drive shaft supported on a base, an indexing member rotatably mounted to the base, a driven member supported by the base adapted to selectively rotatably engage the indexing member, interconnecting means driven at a first end by a first crank arm associated with said drive shaft and connected at a second end to said driven member by a second crank arm whereby said drive shaft oscillates said driven member in opposite first and second directions through an arc of travel, releasably engaging means carried by said driven member engaging said indexing member during oscillation of said driven member in said first direction, locking means operated in timed relation to rotation of said drive shaft to selectively engage said indexing member to lock said indexing member against rotation and to release said indexing member for rotation during oscillation of said driven member in said first direction; the improvement comprising:

means for varying the length of said second crank arm so as to vary the length of said arc of travel of said driven member.

2. The indexing apparatus of claim 1 wherein the means for varying the length of the second crank arm comprises:

a first pin having a rotational centerline and pivotally attaching said interconnecting means second end to said driven member;

an eccentric bushing having a rotational centerline and including an inside diameter rotatably supported by said base and an outside diameter rotatably engageable with a driven member bore;

a distance between the rotational centerlines of said bushing inside diameter and said first pin defining the length of said second crank arm; and whereby rotation of said eccentric bushing within said driven member bore varies said second crank arm length to vary said arc.

3. The indexing apparatus of claim 2 further comprising:

a shaft supported by said base including a lower end;

said eccentric bushing rotatably supported by said shaft lower end;

a flange formed on said bushing extending radially outward therefrom and abutting said driven member; and a plurality of angularly spaced threaded apertures positioned on a circle concentric with said driven member bore, an aperture formed in said flange to selectively align with said threaded apertures, a bolt engaging said aperture and theadingly engaging said threaded aperture to secure said eccentric bushing to said driven member.

* * * * *

UNITED STATES PATENT AND TRADEMARK OFFICE
CERTIFICATE OF CORRECTION

PATENT NO. : 4,378,707  
DATED : April 5, 1983  
INVENTOR(S) : Richard W. Jeffries Page 1 of 3

It is certified that error appears in the above-identified patent and that said Letters Patent are hereby corrected as shown below:

In the drawing, add sheet 2 and 3 containing Figures 2 and 3, and 4 and 5, as shown on the attached sheets.

Signed and Sealed this

Seventh Day of February 1984

[SEAL]

Attest:

Attesting Officer

GERALD J. MOSSINGHOFF

Commissioner of Patents and Trademarks